United States Patent [19]

Meriwether et al.

[11] Patent Number: 5,091,935
[45] Date of Patent: Feb. 25, 1992

[54] METHOD AND SYSTEM FOR SCRAMBLING INFORMATION SIGNALS

[75] Inventors: Frank T. Meriwether, Ramona; Robert S. Block, Marina Del Ray, both of Calif.

[73] Assignee: Maast, Inc., Los Angeles, Calif.

[21] Appl. No.: 850,090

[22] Filed: Apr. 10, 1986

Related U.S. Application Data

[63] Continuation of Ser. No. 574,616, Jan. 27, 1984, abandoned.

[51] Int. Cl.$^5$ .................................................. H04N 7/167
[52] U.S. Cl. .................................................. 380/15; 380/6; 380/7; 380/48; 455/1
[58] Field of Search ............... 358/114, 118, 119, 120, 358/121, 123; 178/22.01; 179/1.5 M; 455/1, 30; 380/6, 7, 15, 48; 455/1, 30

[56] References Cited

U.S. PATENT DOCUMENTS

3,729,576 4/1973 Court ..................................... 380/7
4,521,809 6/1985 Bingham et al. ........................ 380/7

Primary Examiner—Stephen C. Buczinski
Attorney, Agent, or Firm—Burns, Doane, Swecker & Mathis

[57] ABSTRACT

A method and system for scrambled transmission of an information signal having a regular, repeating information rate from which a receiver of the information signal derives synchronizing information as in a television video signal. The information signal is summed with a scrambling signal having a frequency which is a function of the information rate plus an error quantity within a predetermined bandwidth, namely that of the synchronizing circuitry in the normal information receiver. The sum of the information signal and the scrambling signal is transmitted as the scrambled information signal. In a television scrambling system, the information signal is a television video signal and the information rate is a video synchronizing rate, preferably the horizontal line rate. The television information signal also includes an audio signal which is scrambled by mixing the audio signal with a carrier signal realted to the video synchronizing rate, to produce a lower sideband which is transmitted as the television audio signal. The frequency of the scrambling signal $F_j$ is defined by the equation $F_j = A \cdot F_h + B$, where A is an integer, B is the value error quantity, and $F_h$ is the information rate. To increase scrambling security, the frequency of the scrambling signal may be modified periodically. Also disclosed is a method and system for decoding or unscrambling the scrambled information signal.

5 Claims, 7 Drawing Sheets

METHOD AND SYSTEM FOR SCRAMBLING INFORMATION SIGNALS

This application is a continuation of application Ser. No. 574,616, filed Jan. 27, 1984, now abandoned.

BACKGROUND OF THE INVENTION

The present invention relates to a method and system for scrambling transmitted information and, more particularly, to a method and system for scrambling and unscrambling the transmissions of information services such as subscription television to prevent the unauthorized use of such services.

The secure transmission of information has become extremely important, particularly in the field of television transmission via cable, satellite and other media. Numerous encoding or scrambling techniques have been developed and some are now in use, particularly in broadcast systems where there is no control over who receives the signals and the signals must be encoded to prevent unauthorized use of the received signals.

One known broadcast subscription television system transmits a video signal that has ben amplitude modulated by a sine wave signal in such a way that the blanking and synchronizing levels cannot be recognized by a normal television receiver. Specifically, the video signal is modulated in amplitude by a sine wave synchronized with the horizontal line rate of the video. The sine wave amplitude modulates the synchronizing signals and the video signal so that they are at the same level other than that which the television receiver expects. Thus, the television receiver synchronizes on something other than the normal synchronizing signals. The resulting video display on the normal television receiver is unintelligible or at least very annoying to a viewer.

While this method is relatively inexpensive and effective, it can be easily defeated and cannot be made secure. The sine wave is at a fixed rate and its amplitude modulation effects can be relatively easily eliminated at the receiver by unauthorized individuals. Since there is no way to vary the scrambling, a fixed circuit arrangement which, in effect, reverses the amplitude modulation, defeats the security of the system.

Other approaches to scrambling have proven more secure but are typically more expensive due to their complexity. In addition, certain other scrambling methods have affected picture quality in an unacceptable manner, and attempts to improve picture quality have resulted in the lowering of the level of security.

OBJECTS AND SUMMARY OF THE INVENTION

It is accordingly an object of the present invention to provide a novel method and system for scrambling information signals for secure transmission thereof in a relatively inexpensive and distortion free manner.

It is a further object of the present invention to provide a novel television signal scrambling method and system in which the scrambling is very effective, security is relatively high, and cost is relatively low.

It is yet a further object of the present invention to provide a novel method and system for scrambling both the audio and video portions of a television signal for broadcast subscription television services such as direct broadcast satellite (DBS) or subscription television (STV) in which the scrambling is very effective, and the scrambled signal can be unscrambled with relatively low cost equipment and without noticable distortion.

It is a more specific object of the present invention to provide a novel method and system for scrambling information signals for secure transmission thereof through the use of one or more scrambling or jamming signals which may be varied in frequency at the transmission end and yet effectively eliminated at the receiving end.

It is yet another object of the present invention to provide a novel television signal scrambling system and method particularly suitable for broadcast television systems in which one or more scrambling or jamming signals effectively scramble both video and audio portions of the television signal and the jamming signal or signals may be varied in a manner which provides relatively high security.

In accordance with the invention, an information signal having a regular, repeating information rate, for example, a television or other video signal, is summed with one or more jamming signals each having a frequency which is a function of the information rate of the information signal plus an error quantity within a predetermined bandwidth. The sum of the information signal and the jamming signal is transmitted as the scrambled information signal.

The scrambled information signal is received, and a jamming signal (or signals) is locally generated at the receiver. The locally generated jamming signal is identical in frequency and 180° out of phase with the jamming signal in the scrambled information signal. The locally generated jamming signal is summed with the received scrambled information signal and cancels the jamming signal from the scrambled signal.

In a preferred embodiment of the invention, the information signal is a television video signal. The jamming signal frequency is a function of a synchronization rate of the video signal and an error quantity within the pass band of the phase error circuitry within a normal television receiver synchronizing circuit. The video signal is summed with the jamming signal and the thus scrambled video signal is transmitted in a conventional manner as in normal broadcast television or DBS.

To prevent over-modulation in a television transmission system, the video signal may be preemphasized to lower the amplitudes of signals in the lower end of the video frequency spectrum, particularly the synchronizing pulses, prior to summing with the jamming signal. Of course, in some information transmission systems that may not be necessary.

In scrambling a television signal, the jamming frequency preferably is selected as a function of the horizontal frequency of the video signal plus an error value which is within the pass band of the error amplifier of the horizontal synchronization phase lock circuitry of a normal television receiver. The amplitude of the jamming signal is relatively low, but it has a serious effect on the horizontal phase lock circuitry in the television receiver because it creates an error voltage in that circuitry that results in horizontal displacement of the start of scan lines both left and right of their normal starting position. The scrambling effect is thus very significant. However, because the jamming signal is preferably relatively low in amplitude, e.g., less than about 20% of the video signal amplitude, linearity errors in transmission, typically about 1% in a television system, introduce an insignificant error when the jamming signal is eliminated. For example, a 100 milivolt jamming signal undergoing a 1% linearity error may produce artifacts of about 1 milivolt peak-to-peak after elimination of the jamming signal by the unscrambling circuit. Even with some amplification, this value of error artifacts is insignificant in relation to normal peak-to-peak video which may be on the order of 700 milivolts. Thus, the error artifacts do not create any visible problem in the quality of the unscrambled video signal.

BRIEF DESCRIPTION OF THE DRAWINGS

The foregoing and other objects and advantages of the present invention will become more apparent to one skilled in the art to which the invention pertains from the following detailed description when read in conjunction with the appended drawings in which.

DETAILED DESCRIPTION

FIGS. 1 through 4 illustrate a scrambling and unscrambling portion of a television system in which viewers pay for services to which they subscribe. For example, the system illustrated in the drawings may be used in a direct broadcast satellite (DBS) system to scramble television video and audio signals so that they may not be used by unauthorized persons.

It should be noted that the scrambling and unscrambling portions of the system of the present invention may be combined with other features provided in DBS and STV systems, such as addressing schemes, pay-per-view, teletext, etc. Particular implementations of the present invention with existing information transmission systems and known features of such systems will be apparent to one skilled in the art and are therefore not specifically disclosed herein in detail. Moreover, details of known information transmission systems such as modulation and broadcast schemes are not set forth herein since the use of the present scrambling and unscrambling techniques with such systems is relatively straightforward.

Figure 1:
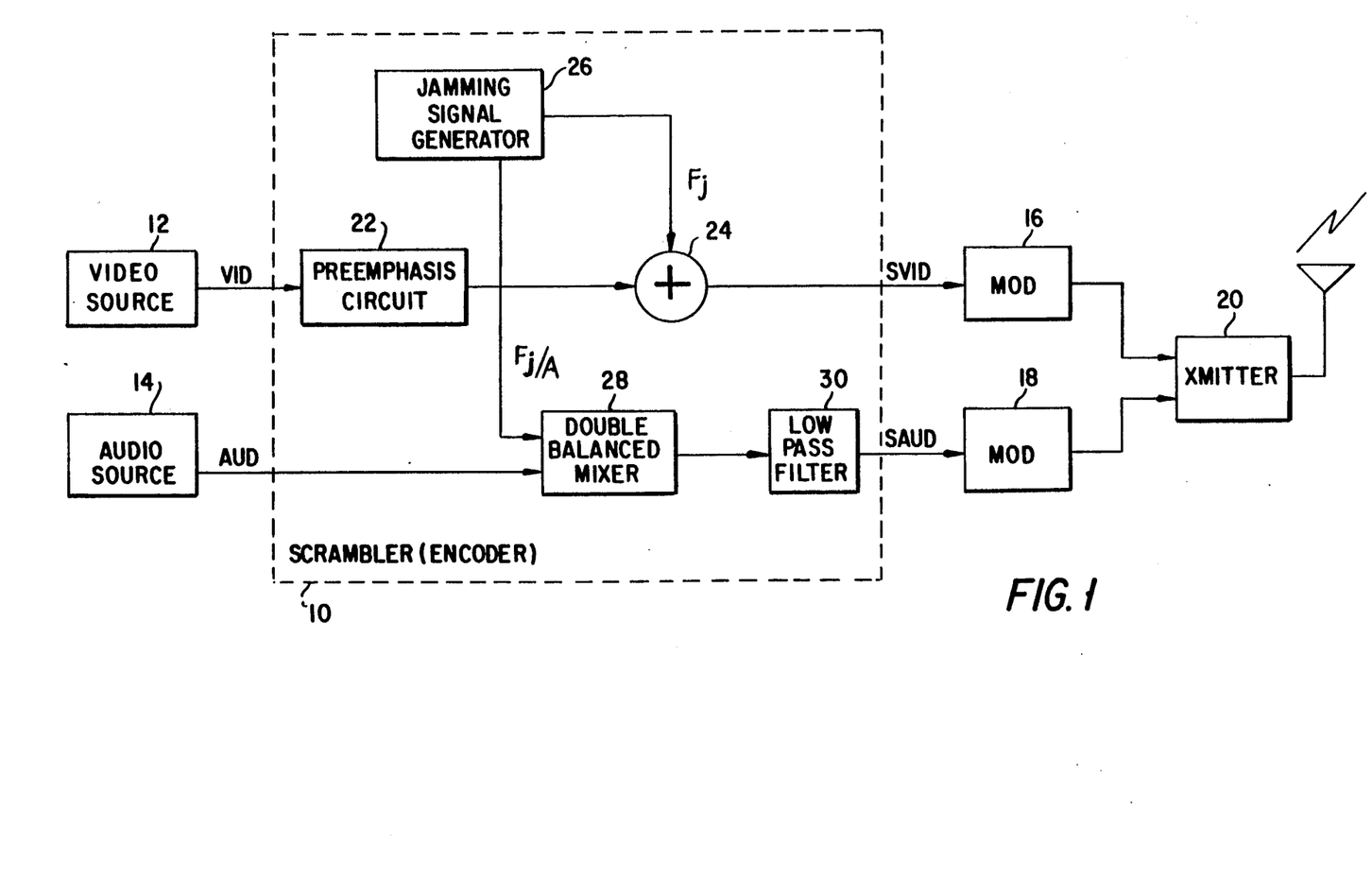
FIG. 1 is a functional block diagram of one embodiment of a scrambler or encoder in accordance with the present invention.
Figure 2:
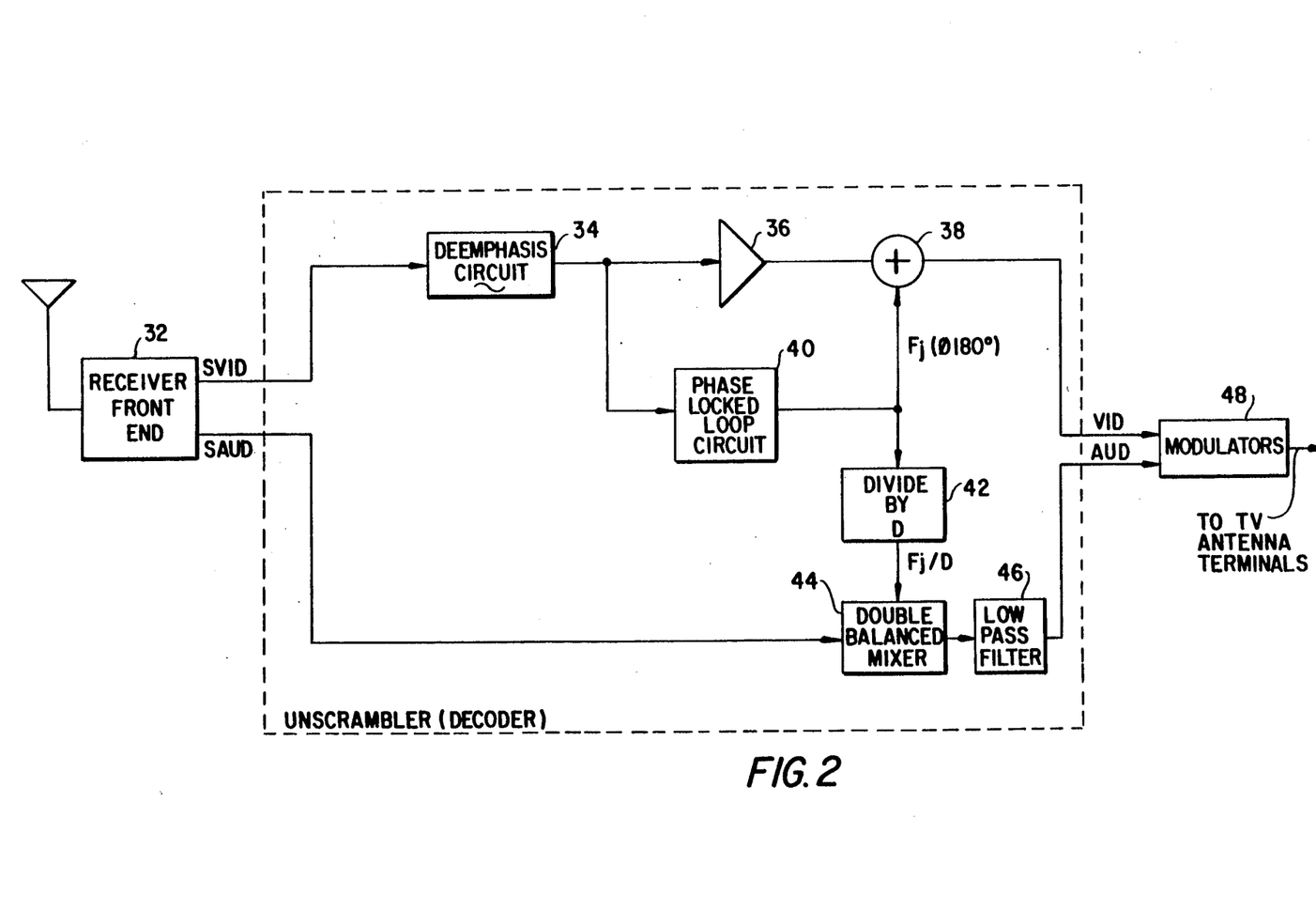
FIG. 2 is a functional block diagram of an unscrambler or decoder for unscrambling the signals transmitted by the encoder illustrated in FIG. 1.

One embodiment of the present invention in a medium level security, television transmission environment is illustrated in FIGS. 1 and 2. Referring now to FIG. 1, wherein a scrambler or encoder 10 in accordance with the invention is illustrated, the scrambler receives unscrambled video and audio signals from respective sources 12 and 14 as in any normal television transmission system. Similarly, the scrambled output signals are provided to conventional transmission circuits such as the illustrated modulators 16 and 18 and the transmitter 20. The scrambler 10 is thus interposed between the normal video and audio sources and the normal transmitting equipment in a conventional transmission system such as DBS, cable or STV, and it will be appreciated that the input and output equipment with which the scrambler is used need not be described further.

With continued reference to FIG. 1, the scrambler 10 includes a conventional preemphasis circuit 22 through which the video signal from the video source 12 is routed. The output signal from the preemphasis circuit 22 is applied to a conventional summing circuit 24 which receives a second signal from a conventional signal generating circuit designated the jamming signal generator 26. The output signal from the summing circuit 24 is the scrambled video signal and is applied to the modulator 16.

The audio signal from the audio source 14 is applied to a conventional double balanced mixer 28 together with a jamming signal from the jamming signal generator 26. The output signal from the balanced mixer 28 is applied through a conventional low pass filter 30 to the modulator 18 as the scrambled audio signal.

In operation, the unscrambled video signal is preemphasized by the preemphasis circuit 22 in accordance with a function which attenuates the low frequency components of the video signal and has a flat response to the high frequency components. Thus, the synchronizing or sync signals (e.g., horizontal sync) and other low frequency components are attenuated.

The preemphasized video signal is summed with the jamming signal by the summer 24. Since the video signal has been preemphasized, those low frequency components which are normally the highest amplitude are at a lower than normal level, and the summed jamming signal does not raise the video signal to a level that would drive the modulator beyond its normal operating range (e.g., the modulator is not overdriven into a non-linear range). A preemphasis on the order of 6 db. has been found to be acceptable for this purpose.

The jamming signal has a frequency $F_j$ related to the frequency of a video synchronizing signal plus an error quantity, i.e., $F_j = AF_h + B$ when A is an integer, $F_h$ is the frequency of the video synchronizing signal and B is the error quantity. In accordance with the preferred embodiment, that synchronizing signal is the horizontal snyc signal $F_H$ and the error quantity is a quantity within the pass band of the horizontal synchronizing circuit in a normal television receiver. In particular, the normal television receiver includes a phase locked loop which generates the horizontal synchronizing signal for the television set in response to the received video signal. That phase locked loop contains an error amplifier which will respond to frequency errors within a pass band of about 2500 Hz. Thus, the error quantity B is within that pass band and preferably a multiple of the television field rate.

In the embodiment illustrated in FIG. 1, the jamming signal frequency $F_j$ is given by $AF_H + B$ where A is an integer which remains constant. The error quantity B is preferably a function of the field rate of the video signal which, in NTSC systems, is about 59.94 Hz. As will be appreciated by one skilled in the art, the effect of the error quantity B on a normal television receiver is to cause a displacement of the starting points of the horizontal lines. With an error quantity B equal to the field rate, one displacement cycle, both positive and negative, will occur over the face of the television screen. If B is equal to twice the field rate, then two displacement cycles will occur and so on. Very effective scrambling can be achieved using an error quantity B equal to about three to five times the field rate.

The audio signal is scrambled by mixing it with a signal having some predetermined relationship to the jamming signal and transmitting the lower sideband of the product of the mixer. More specifically, the mixer 28 will output the original input signals and their sum and difference. The difference or lower sideband is the audio signal on a suppressed carrier which is, in effect, the audio signal inverted about some frequency determined by the frequency of the jamming signal.

For example if the signal applied to the mixer 28 is $F_j/D$, where D is equal to A, then the audio signal will vary in the normal baseband audio range (0-15 KHz) but the low frequency audio will appear at the upper end of the range and vice-versa. In a system where $F_j$ is related to $F_H$ which is 15,730 Hz, the audio signal thus varies from 15.73 KHz to zero inversely with the audio signal frequency. A 300 Hz audio signal would thus be scrambled and appear as a 15.43 KHz signal in the output of the low pass filter 30.

FIG. 2 illustrates a decoder or unscrambler for use at a subscriber location to unscramble the scrambled video and audio signals transmitted in accordance with the embodiment of FIG. 1. Referring now to FIG. 2, the scrambled audio and video signals are received and demodulated by a suitable conventional receiver front end 32. The nature of the receiver front end will vary, depending upon the nature of the transmitted signal. For example, a conventional satellite receiver may be used in a DBS system to provide the scrambled video and audio signals SVID and SAUD at the baseband level. A receiver suitable for conventional television frequencies may be used in an STV broadcast system. Other types of receivers may be used in cable systems.

The scrambled video signal SVID is supplied to a conventional deemphasis circuit 34 which deemphasizes the high frequency components of the received signal. The deemphasis circuit 34 is matched to the preemphasis circuit 22 of FIG. 1 in the sense that it has a frequency crossover corresponding to that of the preemphasis circuit and it deemphasizes or attenuates the high frequencies by an amount comparable to the preemphasis of the low frequencies by the preemphasis circuit 22. For example, if the preemphasis circuit attenuates the low frequency components of the video signal by 6 db, the deemphasis circuit preferably attenuates the high frequency components of the received video signal by 6 db.

The output signal from the deemphasis circuit is supplied through a conventional amplifier 36 to a conventional summing circuit 38. The deemphasis circuit output signal is also supplied to a phase locked loop circuit 40, the output signal of which is applied to the summing circuit 38 and to a conventional divider 42. The output signal from the divider 42 is applied to one input terminal of a conventional double balance mixer 44.

The baseband scrambled audio signal SAUD is supplied to the other input terminal of the balanced mixer 44. The output signal from the balanced mixer 44 is applied through a low pass filter 46 to conventional modulators 48. Similarly, the output signal from the summer 38 is applied to the modulators 48. The output signal from the modulators 48 is supplied to the antenna terminals of a television set.

In operation, the receiver front end 32 receives the transmitted scrambled television signal and provides baseband video and audio signals SVID and SAUD. The deemphasis circuit 34 deemphasizes the high frequency components of the scrambled baseband video signal and the amplifier 36 amplifies the signal from the deemphasis circuit sufficiently to compensate for the preemphasis and deemphasis at the transmitting and receiving end. For example, with a 6 db preemphasis and deemphasis, the amplifier 36 may amplify the signal from the deemphasis circuit by a factor of 2.

The phase locked loop circuit 40 locks onto the jamming signal $F_j$ in the scrambled video signal and generates an output signal having the same frequency as the jamming signal. Sufficient phase shift is built into the phase locked loop 40 to provide a replica of the jamming signal frequency phase shifted by 180° relative to the jamming signal in the incoming scrambled video. The summation of the scrambled video signal with this phase shifted replica of the jamming signal by the summing circuit 38 therefore eliminates the jamming signal from the scrambled video signal and produces a video output signal VID in its unscrambled form. The modulators 48 merely modulate an appropriate carrier with the video signal so that the output signal from the modulators 48 is compatible with a normal television receiver.

The output signal from the phase locked loop circuit 40 is also divided by the constant D by the divider 42 to produce the signal $F_j/D$ which is mixed with the audio signal SAUD in the double balanced mixer 44. The lower sideband is passed by the low pass filter 46 and thus the output signal from the low pass filter 46 is the unscrambled audio signal AUD. This unscrambled signal is also applied to the modulators 48 to produce a normal television signal compatible with a television receiver.

It will be appreciated that there may be some distortion of the jamming signal in the transmission process due to nonlinearities of the transmitter. As we previously mentioned, however, the relatively low amplitude of the jamming signal ensures that artifacts remaining after summing the locally generated jamming signal with the scrambled baseband video will be on the order of 1 milivolt peak-to-peak and will be insignificant. Moreover, to match the amplitude of the locally generated jamming signal to that contained in the received baseband signal, suitable automatic gain control circuitry (not shown) may be used to control the amplitude of the jamming signal locally generated by the phase locked loop 40.

Figure 3:
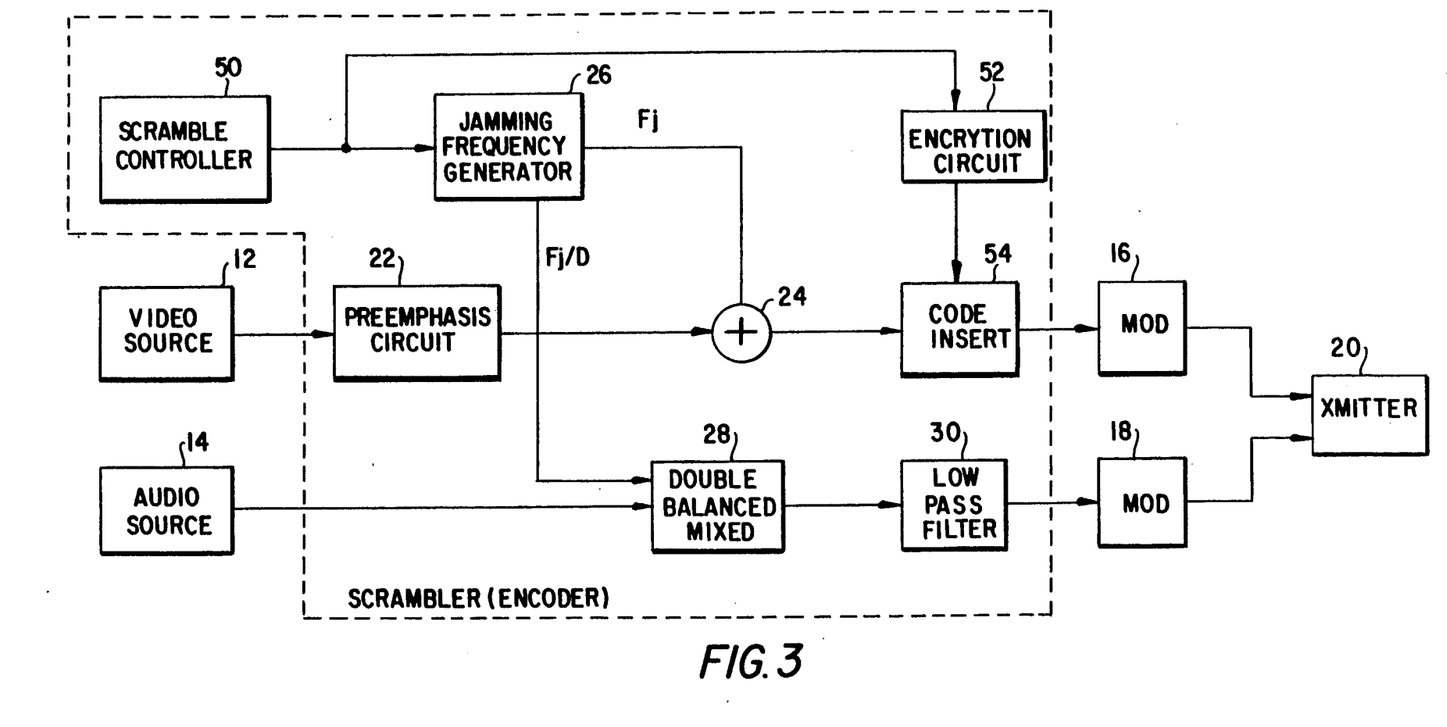
FIG. 3 illustrates an alternative embodiment of the scrambler or encoder of FIG. 1 in which security is increased by modifying the jamming signal during the scrambling process; and, FIG. 4 is a functional block diagram illustrating an alternative embodiment of the decoder or unscrambler of FIG. 2 suitable for unscrambling the signals produced by the encoder of FIG. 3.
Figure 4:
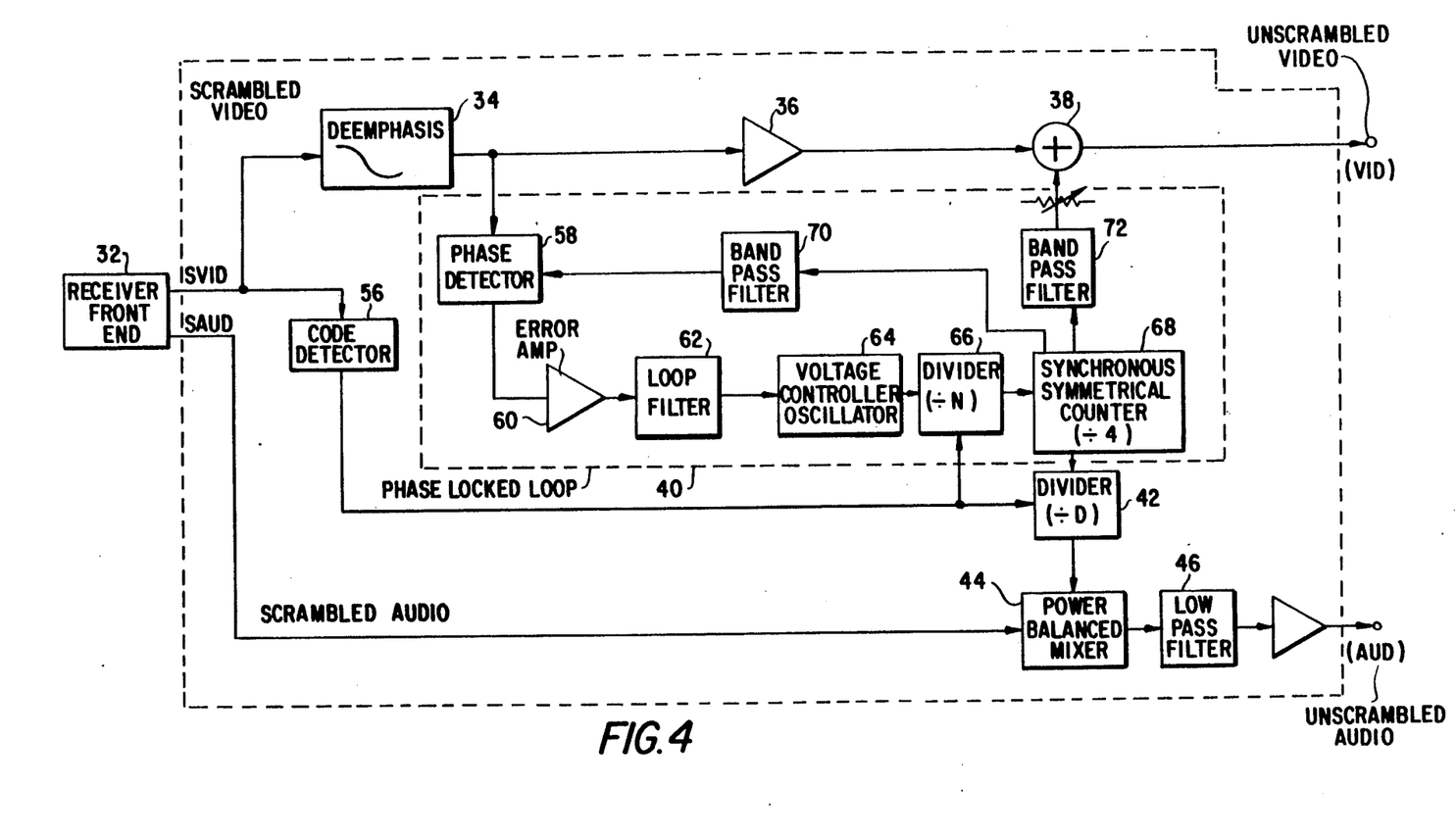

FIGS. 3 and 4 illustrate an embodiment of the invention in which the security level of the scrambling is raised by altering the frequency of the jamming signal $F_j$ on a periodic basis. In the FIGS. 3 and 4, in which like numerical designations are used to indicate elements previously described in connection with FIGS. 1 and 2.

In the FIG. 3 embodiment, the scrambler or encoder includes a scramble controller 50 which changes the frequency of the jamming signal. The controller 50 may be, for example, a psuedo-random number generator which, depending upon the value of the generated number, determines the value of the constant A and/or the error quantity B in the previously noted equation for $F_j$.

In the embodiment of FIG. 3, the scramble controller 50 alters the value of constant A. A control signal from the scramble controller 50 is encrypted by a conventional encryption circuit 52 and is inserted in the transmitted video (or audio) signal by a suitable code insertion circuit 54. For example, the encrypted code may be inserted in the vertical or horizontal interval so that the decoder or unscrambler will be provided with some indication of how the jamming signal is being varied at the transmitting station. Encryption of codes and insertion thereof into video signals is described in the prior art, for example, in U.S. Pat. No. 4,398,216.

In addition or as an alternative to the frequency "hopping" of the jamming signal as indicated above, the jamming signal may be comprised of two or more jamming signals at different frequencies which may remain constant or may vary in response to the controller 50 output signal. Of course, if multiple jamming signals of predetermined, unvarying frequencies are used, there is no need to send a code with the television signal as illustrated in FIG. 3. The decoder or unscrambler would merely be adapted to produce replicas of each jamming signal for summation with the baseband scrambled video, e.g., through the use of multiple phase locked loops or multiple dividers to produce the various jamming frequencies. On the other hand, if the multiple jamming signals are changed in frequency, the encrypted codes would be necessary to inform the decoder of the nature of the frequency changes so that jamming signals of appropriate frequencies may be locally generated.

The scrambled television signals from the encoder of FIG. 3 are received by the receiver 32 of FIG. 4 and converted to baseband as previously described. A suitable code detector 56 detects the transmitted codes which contain the jamming frequency information. These detected codes are used to control the frequency of the output signals applied to the summer 38 and the double balanced mixer 44.

More specifically, the phase locked loop 40 may include a conventional phase detector 58, error amplifier 60, loop filter 62 and voltage controlled oscillator (VCO) 64. In addition, a conventional divider 66 may be provided to divide the VCO output signal by an appropriate value related to the frequency of the jamming signal. This divider 66 may be controlled in any suitable conventional manner to produce an output signal of a proper frequency.

A conventional synchronous symmetrical counter 68 further divides the VCO output signal by a constant (e.g., by 4) and produces an output signal of the proper phase to cancel the jamming signal in the scrambled video signal SVID. As was previously mentioned, the desired phase relationship is 180° out of phase with the transmitted jamming signal. Conventional band pass filters 70 and 72, preferably delay equalized, are provided both in the feedback circuit to the phase detector 58 and the output circuit to the summer 38.

The operation of the decoder of FIG. 4 is identical with that described in connection with FIG. 2 except that the frequency of the locally generated jamming signal may be varied as a function of the encrypted code transmitted in the television signal. That code is detected by the code detector 56 and controls the frequency of the signal from the dividers 66 and 42.

It should be noted that a potentiometer 74 is shown in the output circuit of the phase locked loop 40 to permit manual control of the amplitude of the locally generated jamming signal applied to the summer 38. Such a control may be automated as was previously mentioned. In addition, a suitable conventional amplifier 76 is illustrated in the audio signal path in the event that amplification of the unscrambled audio signal AUD is necessary or desirable before modulation.

Figure 5:
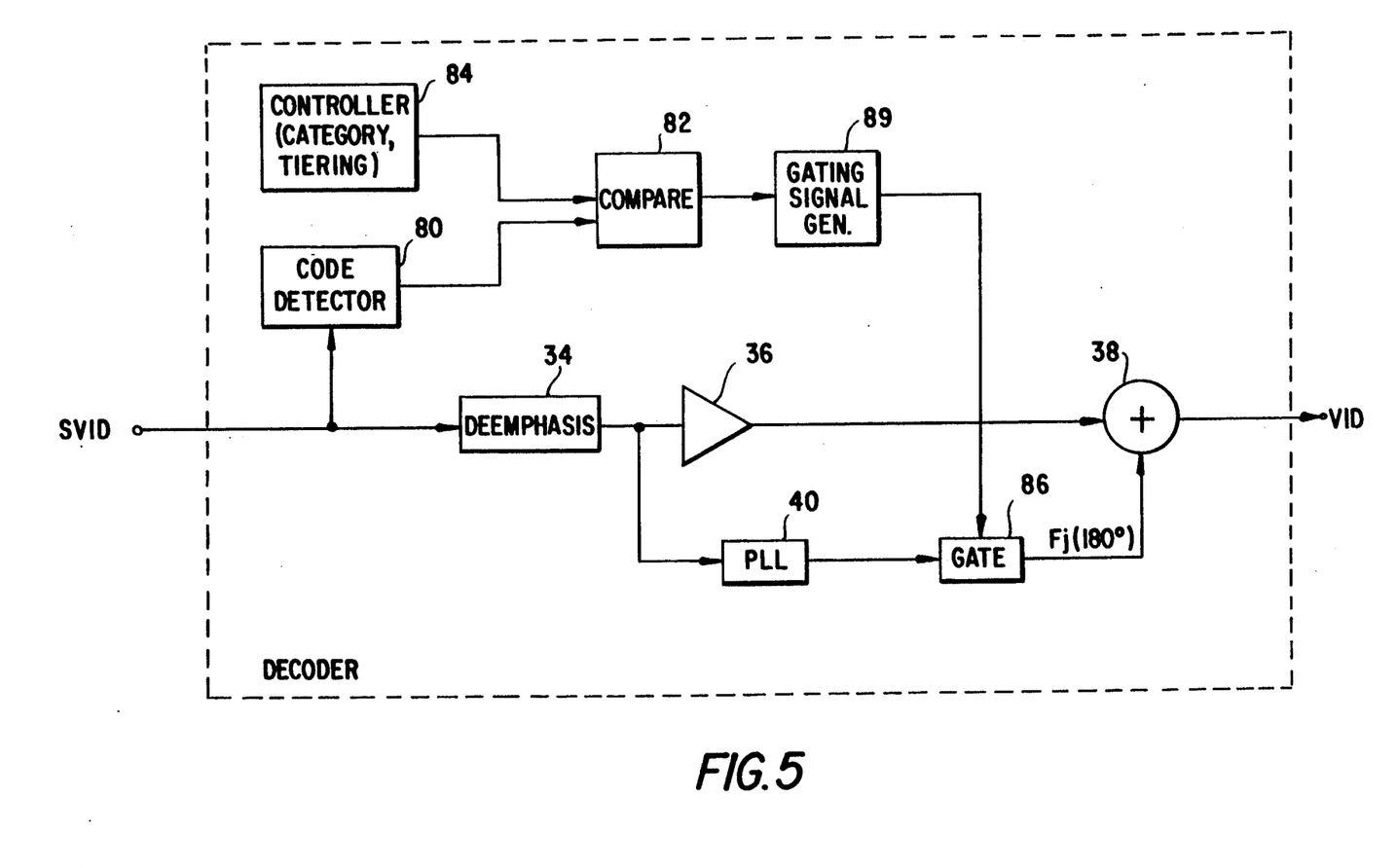
FIG. 5 is a functional block diagram of another embodiment of a decoder in accordance with the present invention.

FIG. 5 illustrates an embodiment of the video channel of a decoder or unscrambler in which command signals are inserted in the television program signal to permit control over the programming available to individual subscribers. For example, category control or tiering signals identifying individual programs or groups of programs may be transmitted in the program signal and detected by a suitable code detector 80 as described in greater detail in U.S. Pat. No. 4,225,884.

The detected code may be compared by a conventional comparator 82 with a code stored in a category or tiering controller 84. That stored code may be, for example, a code indicative of a service for which the subscriber has paid or a code indicative of a category or programming the subscriber wished to view. If the comparison is positive indicating that the subscriber is authorized to use the incoming service and/or has selected it, the comparator 82 causes a conventional multivibrator or other gating signal generator 84 to produce a gating signal which enables a gate 86 and passes the locally generated jamming signal to the summer 38. Thus, the video signal is unscrambled as long as the gate 86 remains enabled.

It may be desirable to avoid modifying the synchronization signals in the video signal and merely add sufficient jamming to ensure effective scrambling. One embodiment of an encoder and a decoder to accomplish that objective is illustrated in FIGS. 6 and 7.

Figure 6:
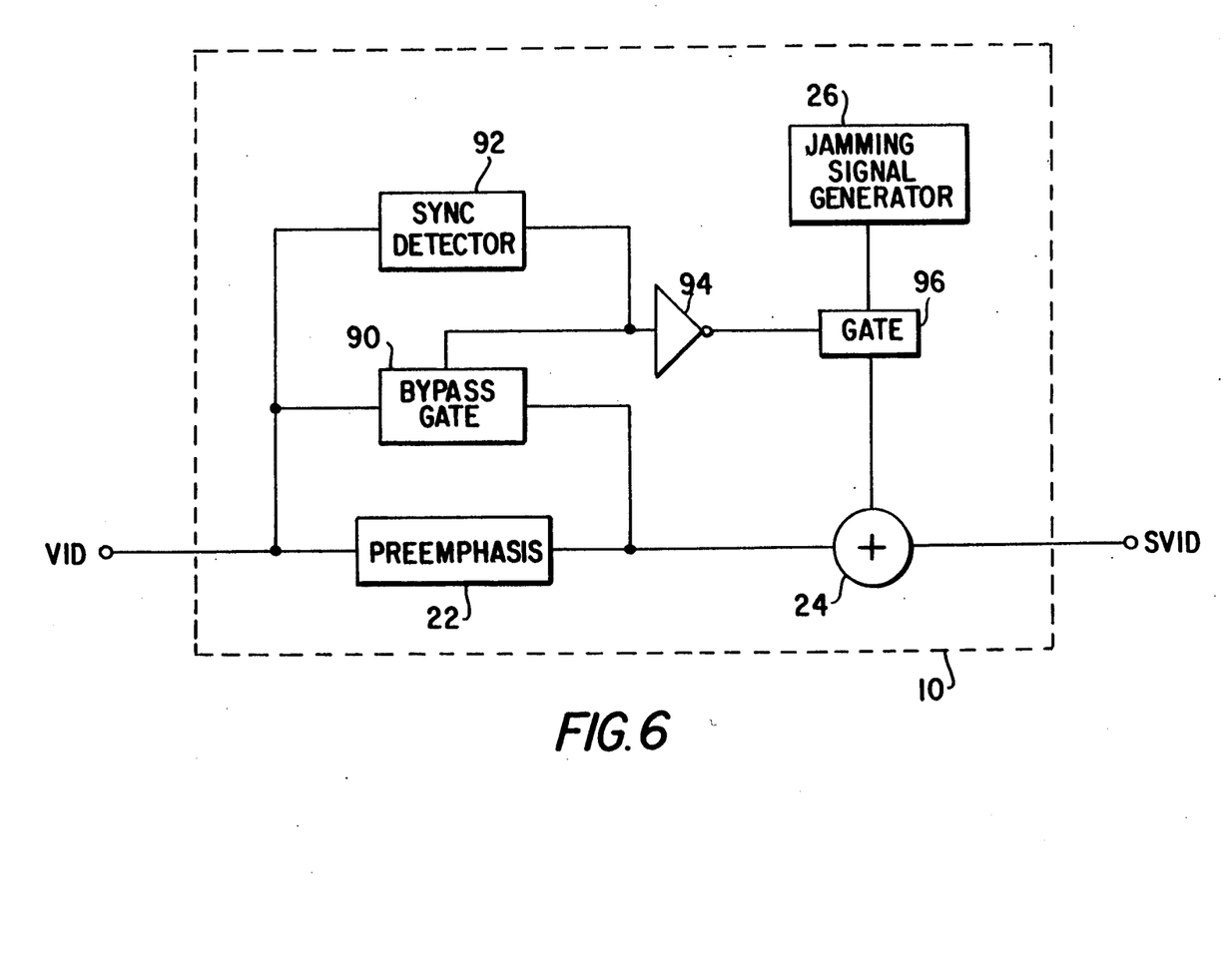
FIGS. 6 and 7 are functional block diagrams of another embodiment of an encoder and decoder for scrambling and unscrambling television video signals without altering the television sync signals.
Figure 7:
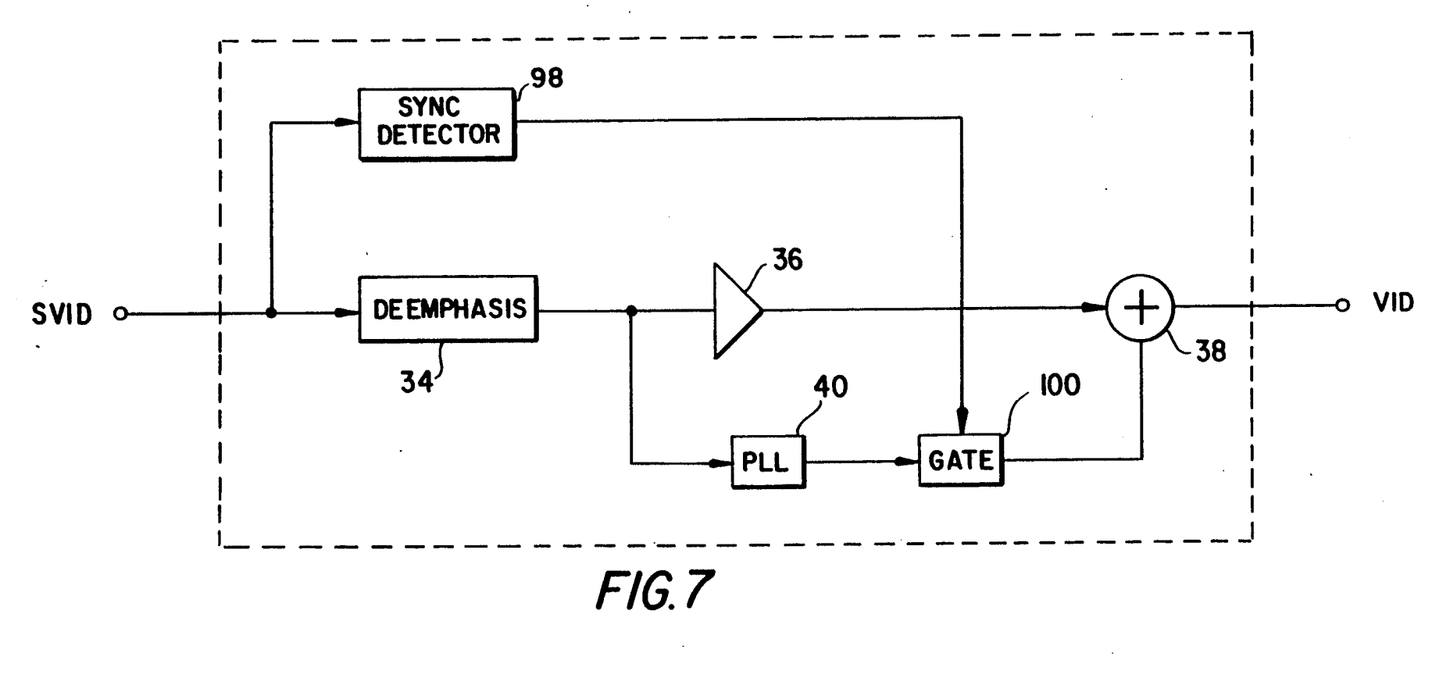

Referring now to FIG. 6, the unscrambled video signal is supplied to the preemphasis circuit 22 in the encoder, to a bypass gate 90, and to a sync detector 92. The output signal from the gate 90 is applied to the summer 24, and the output signal from the sync detector 92 is supplied to the control input terminal of the gate 90 and through an inverter 94 to the control input terminal of a gate 96. The jamming signal from the jamming signal generator 26 is gated through the gate 96 to the summer 24 which provides the scrambled video signal SVID.

In operation, the synchronizing signals in the video are detected by the detector 92 and the sync signals are bypassed around the preemphasis circuit 22 to avoid attenuation. Of course, in a system in which deemphasis is unnecessary, e.g., in a satellite or FM system, the bypass gate 90 will be unnecessary.

The sync detector 92 also disables the gate 96 during the synchronization period. Accordingly, the jamming signal is not applied to the summer 24 during the sync period and the synchronization signal appears unaltered in the scrambled video signal SVID.

In the FIG. 6 embodiment, the jamming signal is preferably comprised of multiple frequencies to ensure effective scrambling. Moreover, the video signal VID is preferably inverted, although it is preferable not to invert the synchronizing signals if they are used, for example, to trigger parts of the system, for recording purposes or the like.

Referring now to FIG. 7, the decoder for the signal scrambled in accordance with the embodiment of FIG. 6 removes the jamming signals as in the previous embodiments. However, the synchronizing signals are detected by a sync detector 98, and the output signal from the phase locked loop 40 is gated to the summer 38 by a suitable gate 100.

The gate 100 is normally enabled and is inhibited by the output signal from the sync detector 98. Accordingly, the locally generated jamming signal is blocked from reaching the summer during the synchronization period. Thus, the sync signals pass through the decoder unaltered and appear in their original form in the unscrambled video signal VID.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Moreover, variations and changes may be made by those skilled in the art without departing from the spirit of the present invention.

What is claimed is:

1. A method for scrambled transmission of a television video signal having a regular, repeating video synchronizing rate from which a receiver of the television video signal derives synchronizing information for controlling the starting position of individual cycles of the television video signal, said television video signal including an associated audio signal,
   summing the video signal with a scrambling signal having a frequency which is a function of the video synchronizing rate plus an error quantity within a predetermined bandwidth, said error quantity having a magnitude sufficient to modify said synchronizing information so that the synchronizing information derived by said receiver produces a displacement of the starting position of said individual cycles from the normal starting position of said cycles;
   mixing the audio signal with a carrier signal related to the video synchronizing rate to produce a lower sideband;
   transmitting the sum of the television video signal and the scrambling signal; and
   transmitting the lower sideband as the television audio signal.

2. The method of claim 1, wherein the carrier signal is the scrambling signal divided in frequency by an integer.

3. A method for scrambled transmission of a television signal including synchronizing information comprising the steps of:
   providing a baseband television video signal with a horizontal line rate $F_h$;
   summing the baseband television video signal with a jamming signal having a frequency $F_j$ given by the equation $F_j = A \cdot F_h + B$, where A is an integer and B is an error quantity having a frequency within the pass band of the phase error amplifier in a normal television receiver horizontal sync circuit, said error quantity having a magnitude sufficient to modify said synchronizing information so that the synchronizing information derived by a conventional receiver which receives said summed signals produces a horizontal displacement of the starting position of scan lines from the normal starting position of said scan lines;
   providing an audio signal associated with the video signal;
   mixing the audio signal with a signal related to the jamming signal to produce a lower sideband signal; and
   transmitting the lower sideband signal and the signal resulting from said summing step.

4. A system for scrambled transmission of a television video signal having a regular, repeating video synchronizing rate from which a receiver of the television video signal derives synchronizing information for controlling the starting position of individual cycles of the television video signal, said television video signal including an associated audio signal, comprising:
   means for summing the television video signal with a scrambling signal having a frequency which is a function of the video synchronizing rate plus an error quantity within a predetermined bandwidth, said error quantity having a magnitude sufficient to modify said synchronizing information so that the synchronizing information derived by said receiver produces a displacement of the starting position of said individual cycles from the normal starting position of said cycles;
   means for mixing the audio signal with a carrier signal related to the video synchronizing rate to produce a lower sideband; and
   means for transmitting the sum of the television video signal and the scrambling signal and for transmitting the lower sideband as the television audio signal.

5. The system of claim 4, wherein the carrier signal is the scrambling signal divided in frequency by an integer.

* * * * *